(12) United States Patent
Cheng et al.

(10) Patent No.: US 12,352,300 B2
(45) Date of Patent: Jul. 8, 2025

(54) QUICK RELEASE STRUCTURE TO ALLOW ADDITIONAL ROTATIONAL ACCESS, SUPPORTING STRUCTURE, AND HOUSING

(71) Applicant: Fulian Precision Electronics (Tianjin) Co., LTD., Tianjin (CN)

(72) Inventors: Hao-Wen Cheng, Neihu (TW); Yen-Lu Cheng, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 497 days.

(21) Appl. No.: 17/871,031

(22) Filed: Jul. 22, 2022

(65) Prior Publication Data

US 2023/0065073 A1 Mar. 2, 2023

(30) Foreign Application Priority Data

Aug. 31, 2021 (CN) .......................... 202111016090.X

(51) Int. Cl.
*F16B 2/18* (2006.01)
(52) U.S. Cl.
CPC ........ *F16B 2/185* (2013.01); *B65D 2590/664* (2013.01)
(58) Field of Classification Search
CPC ........ B65D 2590/664; E05Y 2900/602; E05Y 2900/604; F16B 2/185; F16B 7/10–16; H01L 21/67126; Y10T 403/32467–32524; Y10T 403/595; Y10T 403/7071; Y10T 403/7077–7091
USPC ................ 403/109.1–109.8, 322.4, 374.5, 403/377–379.6
See application file for complete search history.

(56) References Cited

U.S. PATENT DOCUMENTS

| | | | | |
|---|---|---|---|---|
| 4,788,999 A * | 12/1988 | Dalpane | ................. | G21C 9/008 220/326 |
| 6,050,446 A * | 4/2000 | Lei | .................... | H01L 21/67017 220/264 |
| 6,196,504 B1 * | 3/2001 | Lemke | ................. | F16M 11/041 396/428 |
| 7,077,582 B2 * | 7/2006 | Johnson | ................. | F16M 11/16 396/428 |
| 7,101,442 B2 * | 9/2006 | Choi | ................... | H01L 21/6719 220/810 |
| 8,413,301 B2 * | 4/2013 | Fang | ..................... | E05F 1/1058 16/302 |

(Continued)

FOREIGN PATENT DOCUMENTS

| | | |
|---|---|---|
| CN | 107572001 A | 1/2018 |
| CN | 111731642 A | 10/2020 |

*Primary Examiner* — Josh Skroupa
(74) *Attorney, Agent, or Firm* — ScienBiziP, P.C.

(57) ABSTRACT

A quick release and reconnectable structure to allow additional movement beyond the limit of a powered arm providing assistance in the opening of a cover of an enclosure includes a support base, a connector, and a lock. The connector is slidably arranged on the support base and can be separated from the support base. The lock comprises a locking body and a clamping shaft. The locking body is positioned on the support base. The clamping shaft is slidably positioned on the locking body. A holding hole is defined in the connector. The sliding direction of the clamping shaft intersects with the sliding direction of the connector along the support base, and the clamping shaft can be inserted into or withdrawn from the holding hole.

9 Claims, 9 Drawing Sheets

(56) References Cited

U.S. PATENT DOCUMENTS

| | | | | |
|---|---|---|---|---|
| 8,726,704 | B2* | 5/2014 | White | E05B 37/20 |
| | | | | 70/276 |
| 9,151,078 | B2* | 10/2015 | Lackey | E05B 63/143 |
| 11,067,216 | B2* | 7/2021 | Johnson | F16B 7/149 |
| 11,130,444 | B2* | 9/2021 | Oh | B60L 1/16 |
| 11,280,125 | B1* | 3/2022 | Christie | B65F 1/1623 |
| 2020/0029664 | A1* | 1/2020 | Tonelli | E05F 3/02 |
| 2023/0030965 | A1* | 2/2023 | Xu | F16B 2/12 |

* cited by examiner

QUICK RELEASE STRUCTURE TO ALLOW ADDITIONAL ROTATIONAL ACCESS, SUPPORTING STRUCTURE, AND HOUSING

FIELD

The subject matter herein generally relates to housings, using quick release structure and telescopic rod for inspection and maintenance.

BACKGROUND

The upper cover of an enclosed container or housing may be lifted from the body of the container to facilitate the installation and maintenance of a structure within. After the installation and maintenance, the upper cover can be dropped or closed again. However, this method is time-consuming, labor-intensive, and inconvenient.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
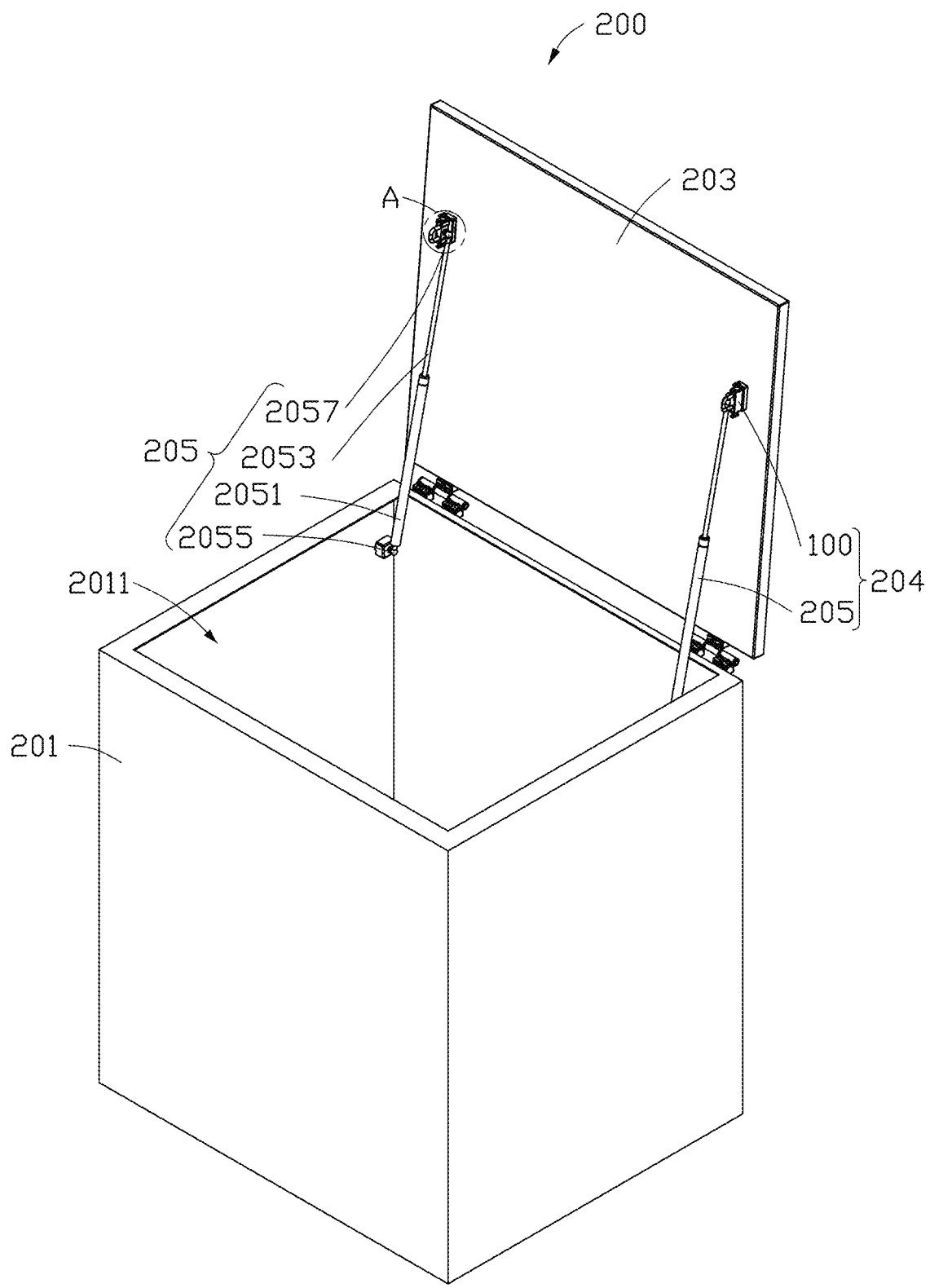
FIG. 1 is an isometric, assembled view of a housing provided by an embodiment of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Without a given definition otherwise, all terms used have the same meaning as commonly understood by those skilled in the art. The terms used herein in the description of the present disclosure are for the purpose of describing specific embodiments only, and are not intended to limit the present disclosure.

Figure 2:
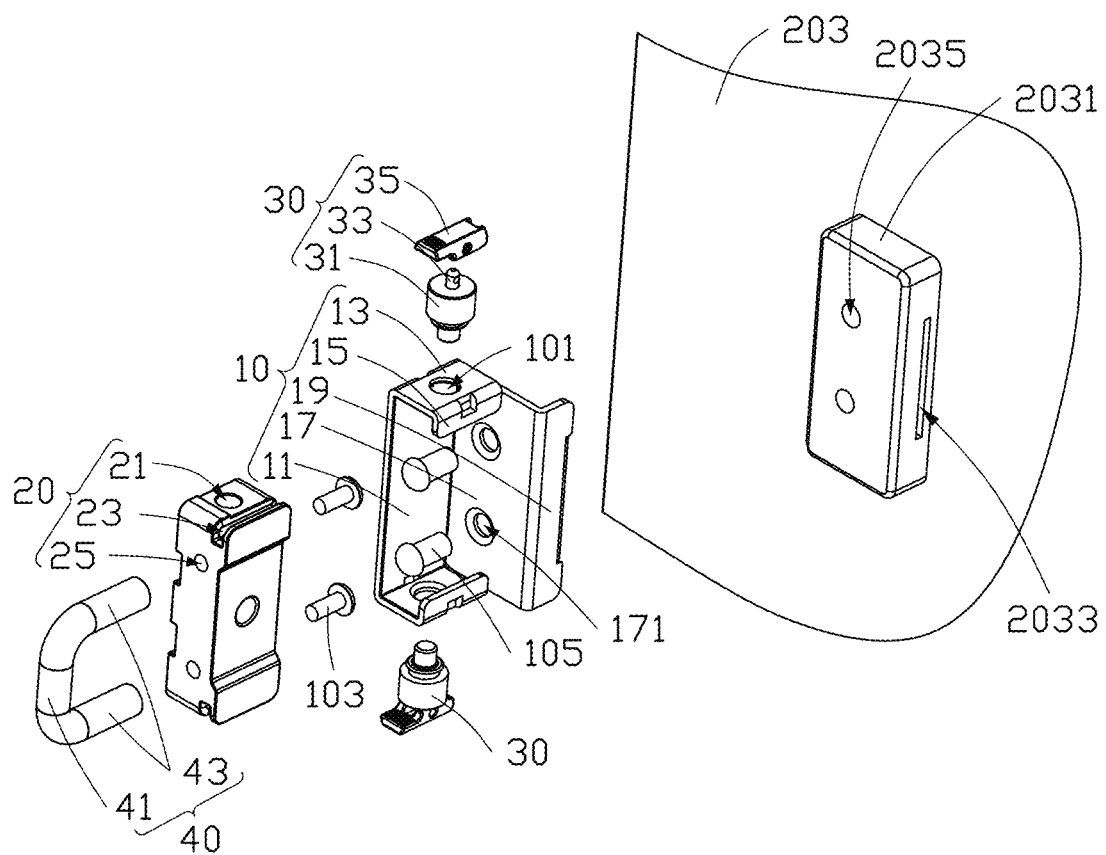
FIG. 2 is an isometric, exploded view of the housing shown in FIG. 1, showing a cover and a quick release structure.
Figure 7:
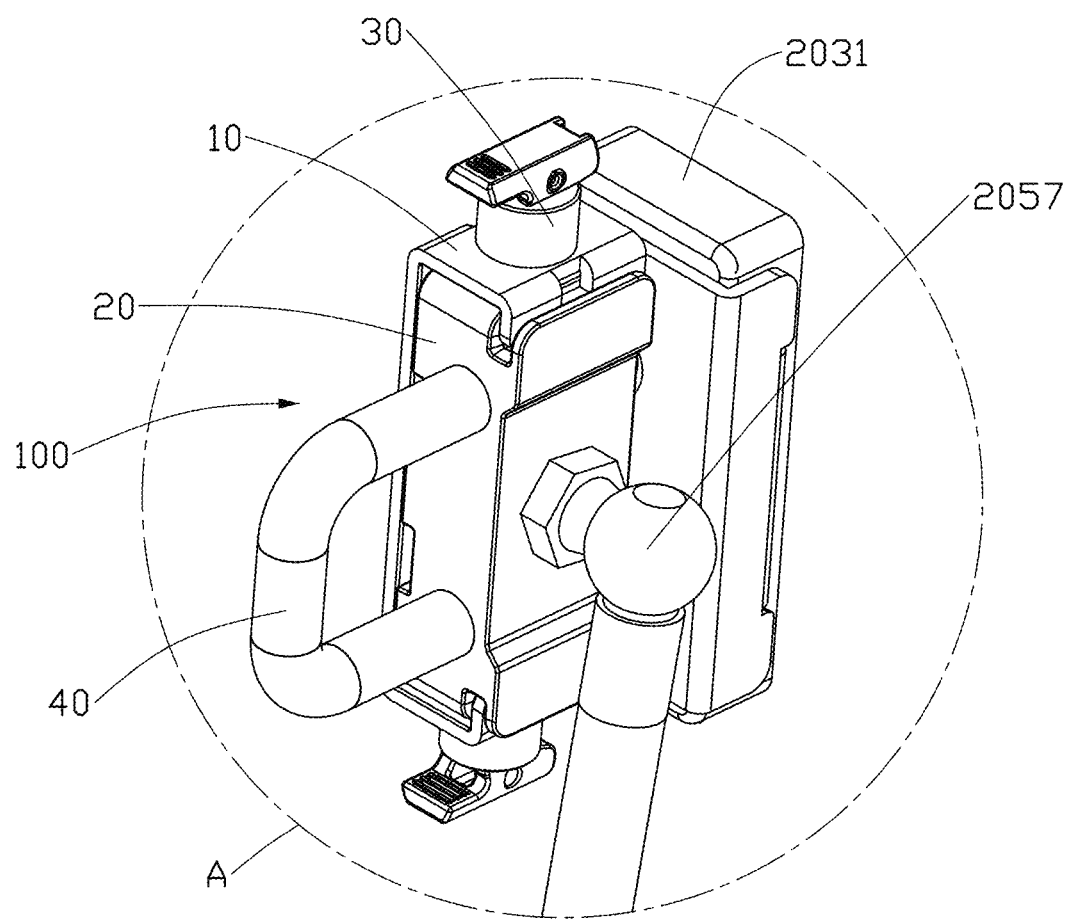
FIG. 7 is an enlarged view of area A labeled in FIG. 1.

As shown in FIG. 1, FIG. 7, and FIG. 2.

As shown in FIG. 2, the quick release structure 100 includes a support base 10, a connector 20, and a lock 30. The support base 10 is positioned on the cover 203. The connector 20 is slidably positioned on the support base 10 and can be separated from the support base 10. The connector 20 is connected to the telescopic rod 205. A holding hole 21 is defined in the connector 20. The lock 30 includes a locking body 31 and a clamping shaft 33, the locking body 31 is positioned on the support base 10, the clamping shaft 33 is slidably positioned on the locking body 31, and the sliding direction of the clamping shaft 33 intersects the sliding direction of the connector 20 along the support base 10. The clamping shaft 33 can be inserted into or withdrawn from the holding hole 21.

Figure 6:
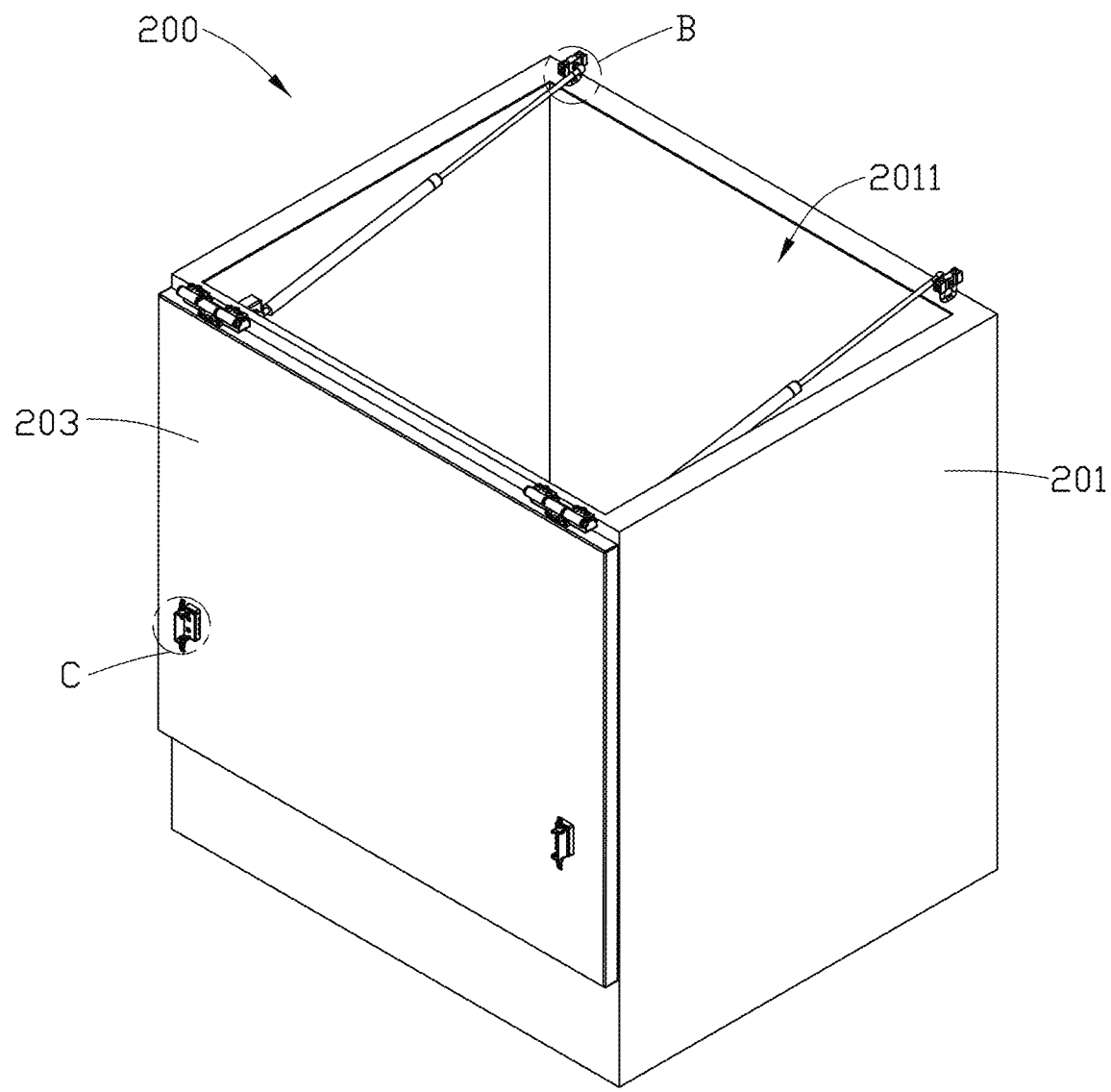
FIG. 6 is an isometric, assembled view of a housing shown in FIG. 1 when the cover is rotated to one side of a housing walls.
Figure 8:
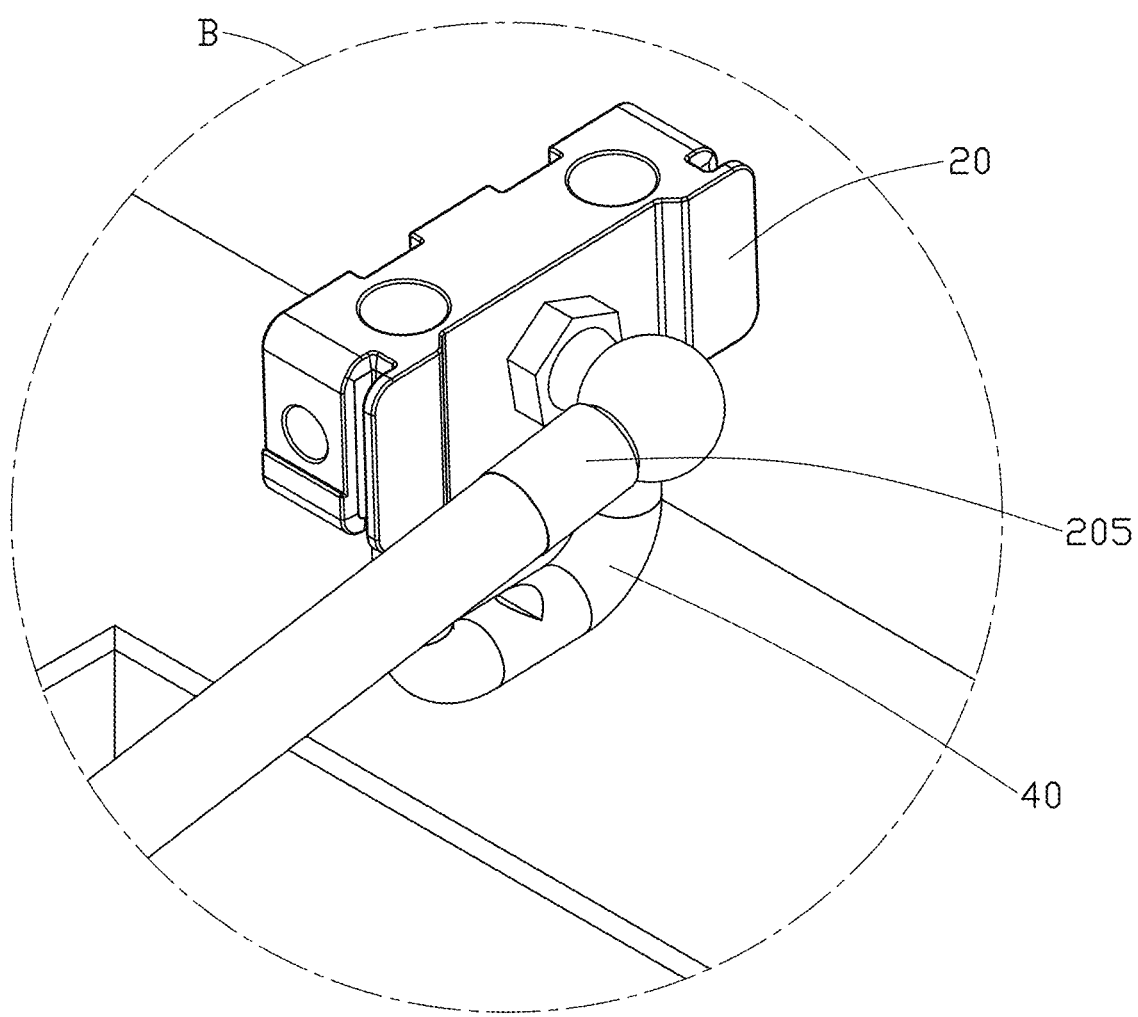
FIG. 8 is an enlarged view of area B labeled in FIG. 6.
Figure 9:
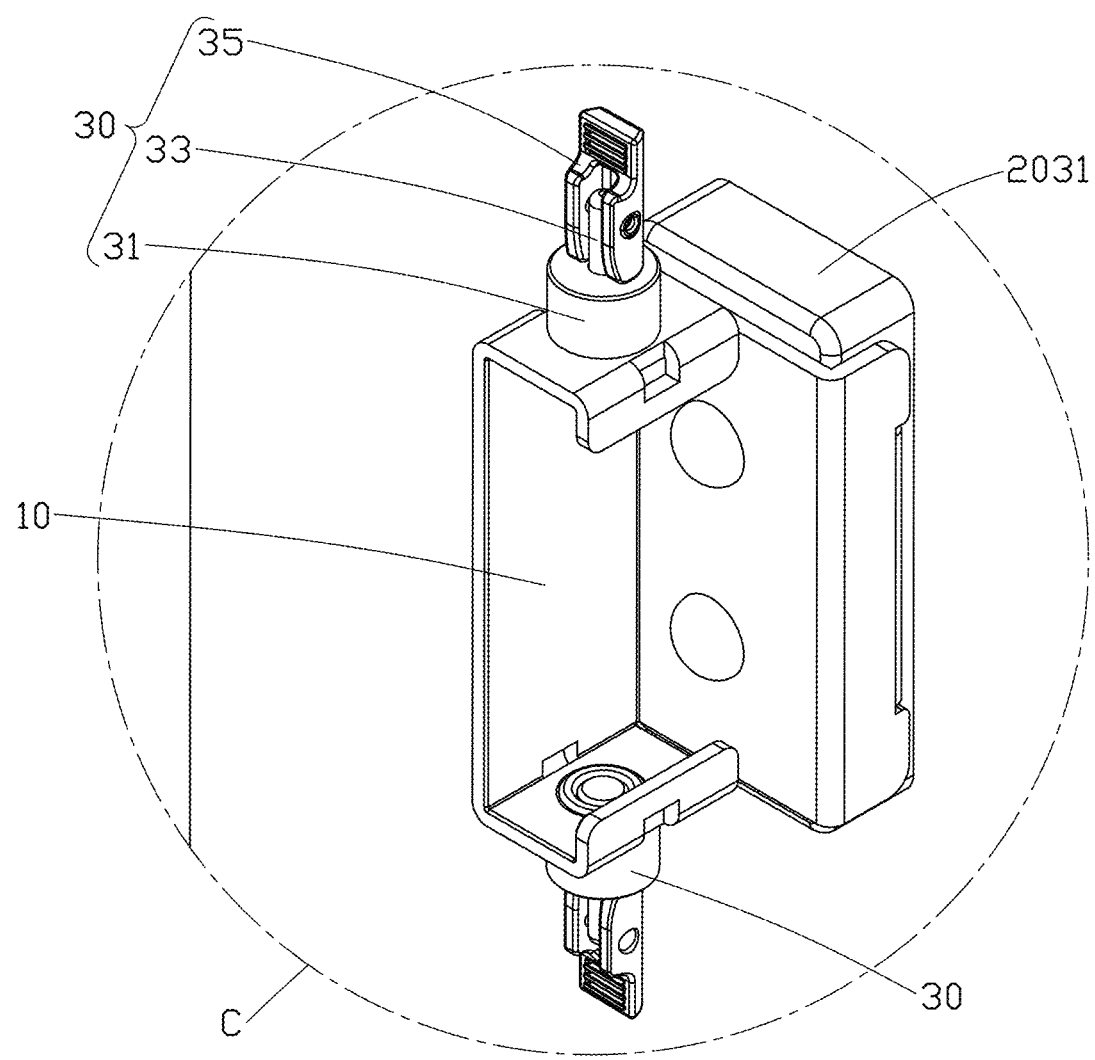
FIG. 9 is an enlarged view of area C labeled in FIG. 6.

When a structure in the housing 200 needs attention, the telescopic rod 205 rotates the cover 203 to gradually expose the opening 2011 until the cover 203 reaches a predetermined angle relative to the housing 200. In one embodiment, the predetermined angle is greater than 90 degrees, but not limited to this. For example, in another embodiment, the predetermined angle may be less than 90 degrees.

as shown in FIG. 6, FIG. 8, and FIG. 9.

The clamping shaft 33 of the lock 30 moves relative to the locking body 31, and can be inserted into or withdrawn from the holding hole 21 defined in the connector 20, so that the support base 10 and the connector 20 can be connected or separated, and then the cover 203 connected to the support base 10 and the telescopic rod 205 connected to the connector 20 can be connected or separated. The quick release structure 100 is used to connect two structural parts, so as to realize the quick connection or disconnection of the two structural parts. When the quick release structure 100 is used in the housing 200, the force rotating the cover 203 relative to the housing walls 201 is reduced, and the cover 203 can be detached from the quick release structure 100, and the cover 203 can continue in rotation to one side of the housing walls 201, so that the opening 2011 of the housing walls 201 is completely exposed.

In another embodiment, one end of the telescopic rod 205 can be rotatably connected to the cover 203, and the other end of the telescopic rod 205 can be rotatably connected to the housing walls 201 through the quick release structure 100.

In an embodiment, the number of the telescopic rod 205 and of the quick release structure 100 is two. Two telescopic rods 205 are arranged on two opposite side's walls of the housing walls 201, and are connected to the cover 203 through two quick release structures 100 to enhance the strength of supporting the cover 203 and improve the rotational stability of the cover 203.

In an embodiment, the sliding direction of the clamping shaft 33 is perpendicular to the sliding direction of the connector 20 along the support base 10, but is not limited thereto. For example, in another embodiment, the angle between the two sliding directions may be another angle such as 70°, and the clamping shaft 33 can move into or out of the holding hole 21.

In an embodiment, the telescopic rod 205 is an elastic element using gas and liquid as the working medium. For example, the telescopic rod 205 is a hydraulic rod. The telescopic rod 205 includes a power part 2051, an output shaft 2053, a first connector 2055, and a second connector 2057. The output shaft 2053 is positioned on the power part 2051. The power part 2051 can drive the output shaft 2053 outwards. The power part 2051 uses the liquid pressure to push the output shaft 2053 to move the output shaft 2053 to the outside of the power part 2051. The first connector 2055 is positioned at one end of the power part 2051 away from the output shaft 2053 and is connected to the housing walls 201. The first connector 2055 enables the power part 2051 to rotate relative to the housing walls 201. The second connector 2057 is positioned at one end of the output shaft 2053 away from the power part 2051, and is connected to the connector 20. The second connector 2057 enables the output shaft 2053 to rotate relative to the connector 20.

In another embodiments, the power part 2051 can be a structure including a spring, and the output shaft 2053 is driven to the outside of the power part 2051 by the elastic force of the spring.

As shown in FIG. 2, the quick release structure 100 further includes the operating part 40. The operating part 40 is positioned on one side of the connector 20. The connector 20 can slide relative to the support base 10 when the operating part 40 is pulled. The operating part 40 is convenient for detaching or installing the connector 20 and the support base 10 together. In another embodiment, the operating part 40 can be omitted.

A first mounting hole 25 is defined in the connector 20. The axis of the first mounting hole 25 is parallel to the direction of the connector 20 sliding relative to the support base 10. The operating part 40 includes a connecting part 41 and a holding part 43. In an embodiment, there are two connecting parts 41. The two connecting parts 41 are placed at both ends of the holding part 43, and the operating part 40 is roughly U-shaped. The connecting part 41 extends in a direction parallel to the axis of the first mounting hole 25. The first connecting hole 411 is defined in the connecting part 41. The quick release structure 100 further includes a first fastener 103. The first fastener 103 passes through the first mounting hole 25 and is screwed to the first connecting hole 411. The operating part 40 is fixed on the connector 20 through the connecting part 41, and the holding part 43 is easy to operate.

In another embodiment, there is one connecting part 41. The holding part 43 is arranged on one side of the connecting part 41, and the operation part 40 is approximately L-shaped.

Figure 3:
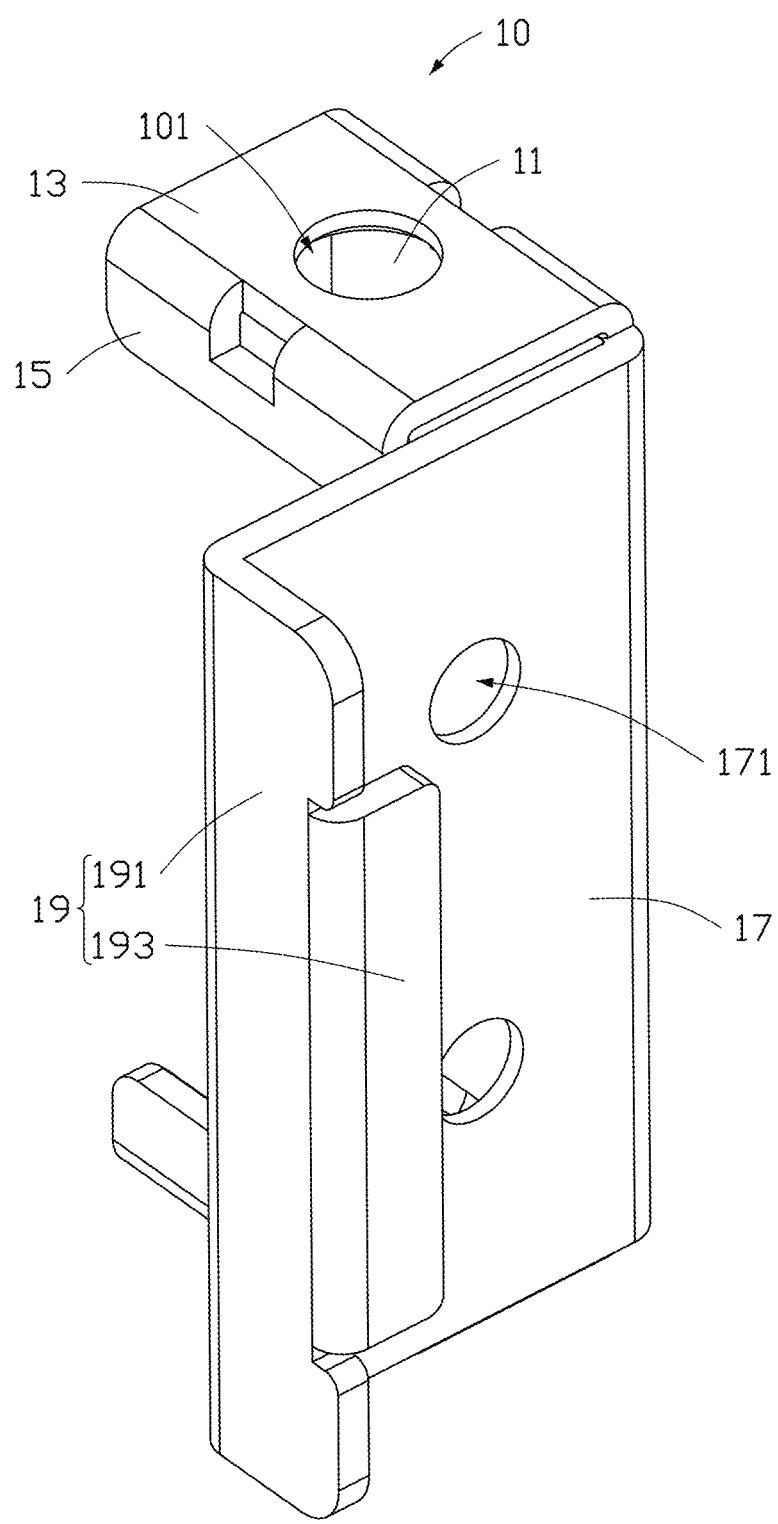
FIG. 3 is an isometric view of a support base in the quick release structure shown in FIG. 2.
Figure 4:
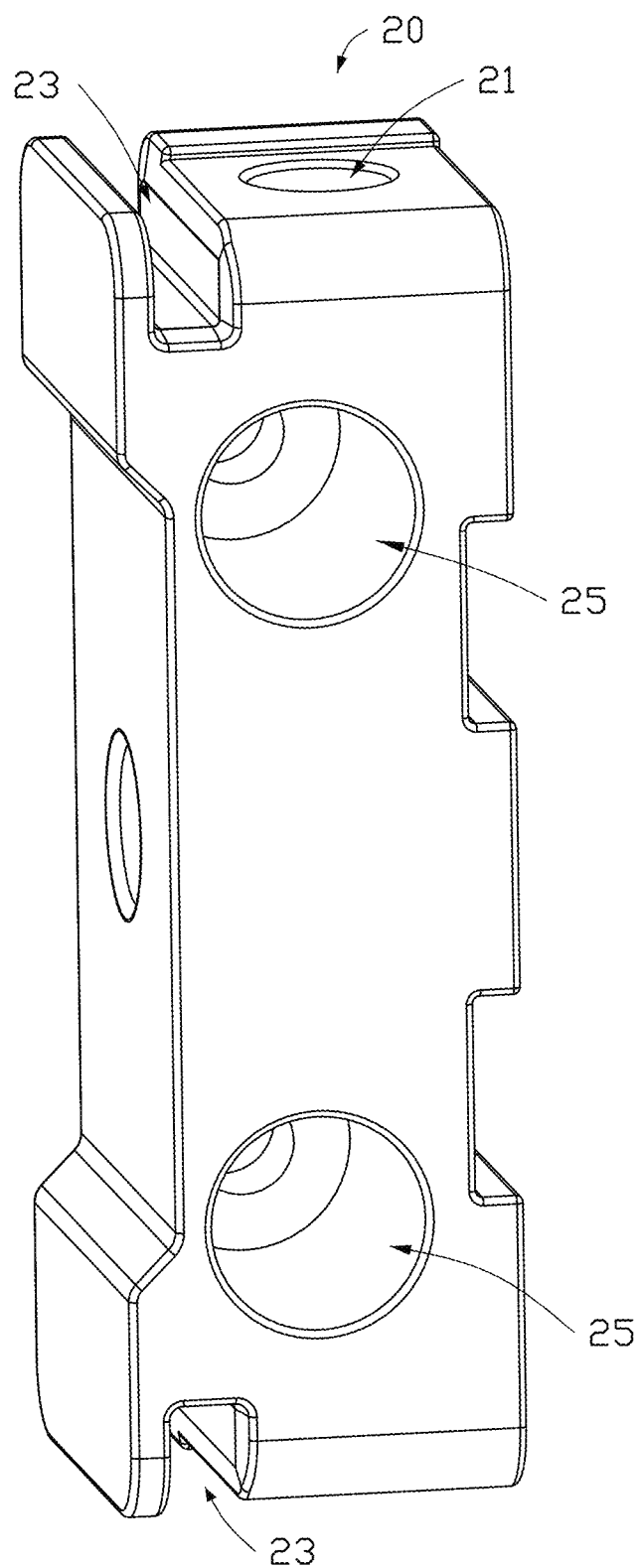
FIG. 4 is an isometric view of a connector in the quick release structure shown in FIG. 2.

As shown in FIG. 2, FIG. 3, and FIG. 4, the support base 10 includes a main body 11 and two side walls 13. Two side walls 13 are provided on opposite sides of the main body 11. A first through hole 101 is defined in the side wall 13. The holding hole 21 communicates with the first through hole 101. The connector 20 slides between the two side walls 13. A holding hole 21 is defined in a side of the connector 20 facing the side wall 13. The clamping shaft 33 can move through the first through hole 101 and be inserted into or withdrawn from the holding hole 21. The clamping shaft 33 is inserted into the holding hole 21 to fix the connector 20 and the support base 10.

The first through hole 101 is defined in the side wall 13, so that the connector 20 is accommodated in the space between the two side walls 13 and is connected to the lock 30.

In another embodiment, the first through hole 101 can be omitted, and the connector 20 can protrude beyond the side of the side wall 13 away from the main body 11 to avoid the holding hole 21 being obscured by the side wall 13. The clamping shaft 33 of the lock 30 is located on a side of the side wall 13 away from the main body 11 and can be inserted into the holding hole 21.

As shown in FIG. 2, the support base 10 further includes an installation part 17 and a positioning part 19. The installation part 17 is arranged on one side of the main body 11 and located on the same side of the two side walls 13. The installation part 17 is positioned on the cover 203. The cover 203 is provided with a bulge 2031. A second mounting hole 171 is defined in the installation part 17. A second connection hole 2035 is defined in the bulge 2031. The quick release structure 100 further includes a second fastener 105. The second fastener 105 passes through the second mounting hole 171 and is screwed to the second connection hole 2035.

The connector 20 is in the space enclosed by the main body 11, the two side walls 13, and the installation part 17, which reduces the volume of the quick release structure 100.

The positioning groove 2033 is defined on one side of the bulge 2031. The positioning part 19 includes a first extension 191 and a second extension 193. The first extension 191 is positioned on one side of the installation part 17. The second extension 193 is arranged on one side of the first extension 191 and is matched with the positioning groove 2033. The first extension 191 is attached to the outer wall of the bulge 2031, and the second extension 193 is inserted into the positioning groove 2033, and then the support base 10 and the bulge 2031 are fixed together, so that the second mounting hole 171 of the installation part 17 is aligned with the second connection hole 2035 of the bulge 2031, and the support base 10 can be quickly installed on the cover 203 to improve the efficiency of the support base 10 installed on the cover 203.

A guide part 15 is provided on the side of the side wall 13 away from the main body 11. A chute 23 is provided on the side of the connector 20 facing the side wall 13. The guide part 15 can be inserted into the chute 23 and can slide in the chute 23 to provide a guide for the connector 20 sliding along the support base 10. The guide part 15 slides in the chute 23, which improves the connection strength and connection stability of the connector 20 and the support base 10.

In another embodiment, the chute 13 may be provided on a side of the connector 20 away from the main body 11, and the guide part 15 extends from the side wall 13 in multiple sections, and the extension direction of the last section of the guide part 15 is parallel to the direction of the connector 20 toward the main body 11, so that the guide part 15 can be inserted into the chute 23.

Figure 5:
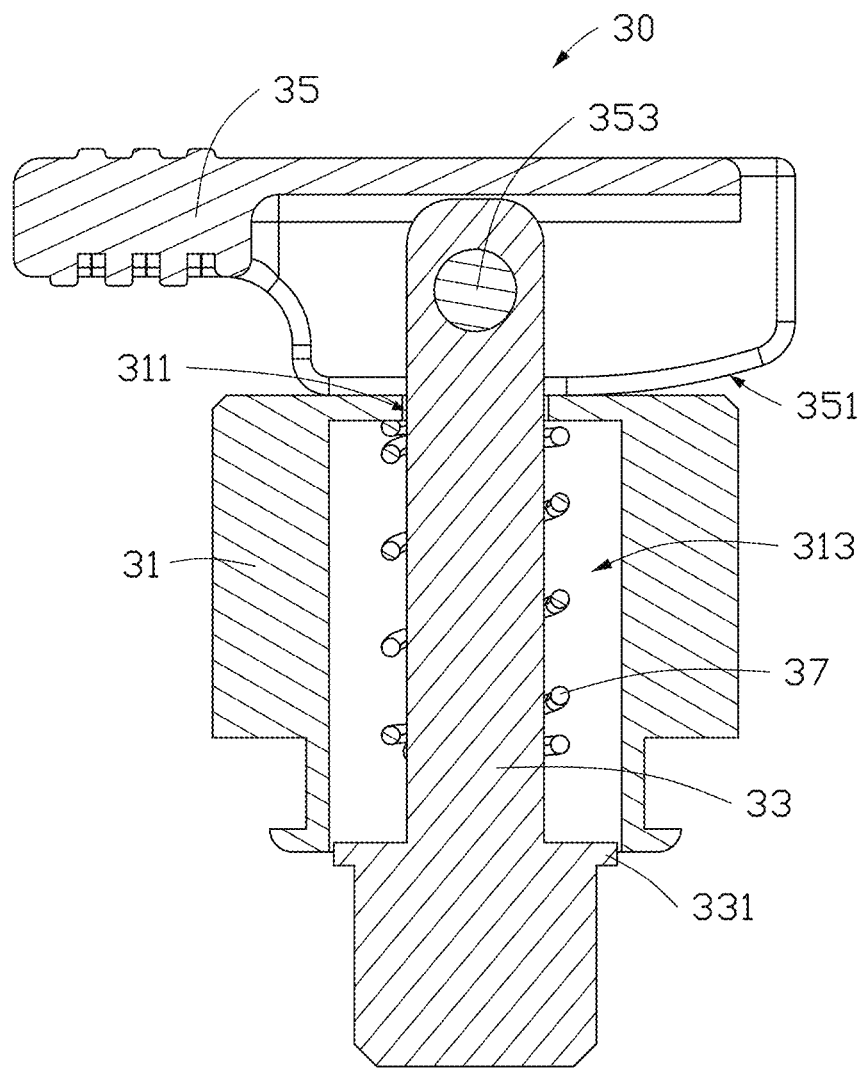
FIG. 5 is an isometric, cross-sectional view of a lock in the quick release structure shown in FIG. 2.

As shown in FIG. 2 and FIG. 5, the lock 30 further includes a handle 35. The handle 35 provides a shaft part 353. The side of the clamping shaft 33 away from the connector 20 is rotatably connected to the shaft part 353. A curved surface 351 is positioned around the handle 35. The curved surface 351 slides along the locking body 31 to drive the clamping shaft 33 to slide along the locking body 31. The curved surface 351 slides along the locking body 31, which changes the distance between the shaft part 353 and the locking body 31, and then the shaft part 353 drives the clamping shaft 33 to slide relative to the locking body 31, so that the clamping shaft 33 can extend into or out of the holding hole 21.

The lock 30 further includes elastic part 37. A second through hole 311 is defined in the locking body 31. The clamping shaft 33 is slidably provided in the second through hole 311. A groove 313 is defined in the side of the locking body 31 facing the support base 10. The groove 313 communicates with the second through hole 311. The clamping shaft 33 is provided with a stopping part 331. The stopping part 331 can slide in the groove 313. The elastic part 37 is positioned in the groove 313. Two ends of the elastic part 37 abut against the stopping part 331 and the bottom walls of the groove 313, which applies a force for the clamping shaft 33 to move toward the holding hole 21, and then the clamping shaft 33 can be stably inserted into the holding hole 21.

In another embodiment, the elastic part 37 may be omitted.

The clamping shaft 33 moves relative to the locking body 31, and can be inserted into or withdrawn from the holding hole 21, and then the support base 10 and the connector 20 can be connected or separated, and the cover 203 connected to the support base 10 and the telescopic rod 205 connected to the connector 20 can be connected or separated. The quick release structure 100 is used to connect two structural parts, realizing the quick connection or disconnection of the two structural parts.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A housing comprising:
   housing walls defining an opening;
   a cover rotatably arranged on the housing walls, the cover configured to cover the opening;
   a telescopic rod for rotating the cover to expose the opening; and
   a quick release structure:
      a support base fixed to the cover;
      a connector slidably and detachably arranged on the support base, the connector defining a holding hole, wherein the connector is rotatably connected to an end of the telescopic rod, another end of the telescopic rod is rotatably connected to one of the housing walls; and
      a lock comprising:
         a locking body positioned on the support base; and
         a clamping shaft slidably positioned on the locking body, wherein
   a sliding direction of the clamping shaft intersects with a sliding direction of the connector along the support base, and the clamping shaft is inserted into or is withdrawn from the holding hole to connect or separate the support base and the connector, respectively, when the support base and the connector are separated, the cover is rotatable further to a side of the housing walls such that the opening is completely exposed.

2. The housing of claim 1, wherein:
   the cover is provided with a bulge, and a positioning groove is defined in one side of the bulge;
   the support base comprises:
   an installation part connected to the bulge, and
   a positioning part comprising:
   a first extension arranged on one side of the installation part; and
   a second extension arranged on one side of the first extension and inserted into the positioning groove.

3. The housing of claim 1, wherein:
   the support base comprises:
   a main body; and
   two side walls positioned on both sides of the main body, respectively;
   the connector slides between the two side walls, and the holding hole is defined on a side of the connector toward the side wall.

4. The housing of claim 3, wherein:
   the side wall is provided with a guide part, a chute is defined in the connector, and the guide part is configured to slidably extend into the chute.

5. The housing of claim 1, wherein:
   the quick release structure further comprises:
   an operating part positioned on a side of the connector;
   the connector slides relative to the support when the operating part is pulled.

6. The housing of claim 5, wherein:
   a first mounting hole is defined in the connector and an axis of the first mounting hole is parallel to the sliding direction of the connector relative to the support;
   the operating part comprises:
   a connecting part extending in a direction parallel to the axis of the first mounting hole; and
   a holding part arranged on a side of the connecting part;
   a first connecting hole is defined in the connecting part;
   the quick release structure further comprises:
   a first fastener configured to pass through the first mounting hole and threadedly connected to the first connecting hole.

7. The housing of claim 1, wherein:
   the lock further comprises:
   a handle provided with a shaft part;
   a side of the clamping shaft away from the connector is rotatably connected to the shaft part;
   a curved surface is positioned around the handle, and the curved surface slides along the locking body to drive the clamping shaft to slide along the locking body.

8. The housing of claim 7, wherein:
   the lock further comprises:
   an elastic part,
   a second through hole defined in the locking body, and the clamping shaft being slidably in the second through hole;
   a groove defined in a side of the locking body facing the support base, and the groove communicating with the second through hole;
   the clamping shaft is provided with a stopping part, and the stopping part slides in the groove;
   the elastic part is positioned in the groove, and two ends of the elastic part abut against the stopping part and the bottom walls of the groove, the elastic part being configured to move the clamping shaft towards the holding hole.

9. The housing of claim 1, wherein:

the telescopic rod comprises:
- a power part;
- an output shaft arranged on the power part;
- a first connector positioned at an end of the power part away from the output shaft and connected to the housing walls; and
- a second connector positioned at an end of the output shaft away from the power part and connected to the connector;
- the first connector enables the power part to rotate relative to the housing walls, and the second connector enables the output shaft to rotate relative to the connector.

* * * * *